United States Patent [19]
Nicholls et al.

[11] Patent Number: 5,213,056
[45] Date of Patent: May 25, 1993

[54] SLACK ADJUSTMENT TESTER

[76] Inventors: Douglas C. Nicholls, Box 1988, Yorkton, Saskatchewan, Canada, S3N 3X3; David E. McLelland, 22 Waterloo Road, Yorkton, Saskatchewan, Canada, S3N 3E8

[21] Appl. No.: 888,862

[22] Filed: May 27, 1992

[51] Int. Cl.⁵ .......................... G01L 5/28; B60Q 1/26
[52] U.S. Cl. ..................................... 116/208; 73/129; 188/1.11
[58] Field of Search ............... 116/208, 283; 188/1.11; 33/600, 609; 73/129

[56] References Cited

U.S. PATENT DOCUMENTS

| | | | |
|---|---|---|---|
| 3,356,188 | 12/1967 | Goldman | 188/1.11 X |
| 4,583,071 | 4/1986 | Sebalos et al. | 188/1.11 X |
| 4,776,438 | 10/1988 | Schandelmeier | 188/1.11 |
| 4,800,991 | 1/1989 | Miller | 116/208 X |
| 4,864,900 | 9/1989 | Kreikle | 81/119 |
| 4,879,964 | 11/1989 | Emerson, Jr. | 116/28 R |
| 4,991,310 | 2/1991 | Melia | 188/1.11 X |
| 5,044,302 | 9/1991 | Goldfein et al. | 116/208 |
| 5,131,163 | 7/1992 | Crewson et al. | 33/609 |

Primary Examiner—Daniel M. Yasich

[57] ABSTRACT

A brake system tool for measuring the slack adjustment between an air cylinder and the brake shoe engagement with the drum of a conventional braking system. The tool includes an elongated tubular body carrying a bushing which slidable supports an indicator. The tool or slack adjustment tester as it is commonly called is held in place by a base releasably attachable to the air cylinder of an air brake system. The base is connected to the indicator. A sliding pin body is adjustably held on the tubular body by a set screw and carries a removeable pin which engages a slack adjuster arm or equivalent throughout its movement. The movement is displayed on the indicator as the tubular body is moved uncovering the indicator for a reading of the indicia.

11 Claims, 2 Drawing Sheets

SLACK ADJUSTMENT TESTER

This invention relates to measuring or indicating free play or slack and more particularly to measuring slack from air cylinder application to brake shoe engagement in a vehicle air brake system.

BACKGROUND OF THE INVENTION

Stopping a vehicle has always been a problem especially when an emergency arises that requires a sudden stop. The use of a friction material rubbing against a metal drum or disc has proven quite satisfactory for stopping, however, the friction material and to some degree the drum or disc wears. With the wearing of material and application linkage a slack or free play increases over the initial desired slack to a point where the braking force becomes inadequate sometimes with disastrous results to the operator and the equipment or vehicle. To remove the excess slack a slack adjuster is usually added in series in the linkage between the air cylinder and the brake shoes. Incorrect adjustment of the slack adjuster has often had catastrophic results. Applicants unique tester removes all doubt that an inaccurate or inadequate adjustment has been made.

Other attempts to rectify this improper adjustment problem have been made such as that shown in U.S. Pat. Nos. 4,079,964 and 4,064,900. In patent "964" there is shown an air canister or air cylinder with a rod extending therefrom to actuate the brake shoe operating cam. A tether including a flag is connected to the canister and to the slack adjuster so that when excessive wear occurs the tether and flag separate from the air canister indicating to the vehicle operator that excess slack exists and must be removed.

Applicants device on the other hand is an indicating device adapted to be easily placed in an operative position on the exterior of the air canister or cylinder and engageable by the slack adjuster, indicating or measuring the travel of the slack adjuster arm relative to the air canister or cylinder. In patent "900" there is shown a "Brake Buddy" tool which you physically apply to the adjuster arm to take up and thereby gauge the degree of slack present. A portion of the tool includes a hammer to free up the locking sleeve and a further portion is in the form of a wrench to adjust the slack or in other words "set up the brakes". Applicants device mounted on the air cylinder and engaged by the slack adjuster arm actually elongates indicating the slack present under actual operating conditions as one operates the vehicle brakes during the checking process. No physical strength is required.

SUMMARY OF THE INVENTION

The present invention provides a slack adjustment tester that has an elongated tubular body means with a bushing slidably supporting an indicating means. The tester is easily placed and held in an operative position by a base releasably attachable to an air cylinder of an air brake system. The base is connected to the indicating means. A sliding pin body is adjustably held on the tubular body by a set screw and carries a pin which engages a slack adjuster arm throughout its movement, the movement being displayed as the degree of slack by the indicating means which is normally zeroed upon installation.

It is readily discernible from the above summary that it is a prime object of the instant invention to provide a slack adjustment tester that produces an accurate indication of the state of adjustment of the brakes.

It is a further object of this invention to provide a slack adjustment tester that is extremely simple to operate.

It is a further object of this invention to provide a tester that is effective and easy to manufacture.

These and other objects of the present invention will become readily apparent as the following description is read in conjunction with the accompanying drawings wherein like reference numerals indicate like elements throughout the several views.

DETAILED DESCRIPTION OF PREFERRED EMBODIMENT

Figure 1:
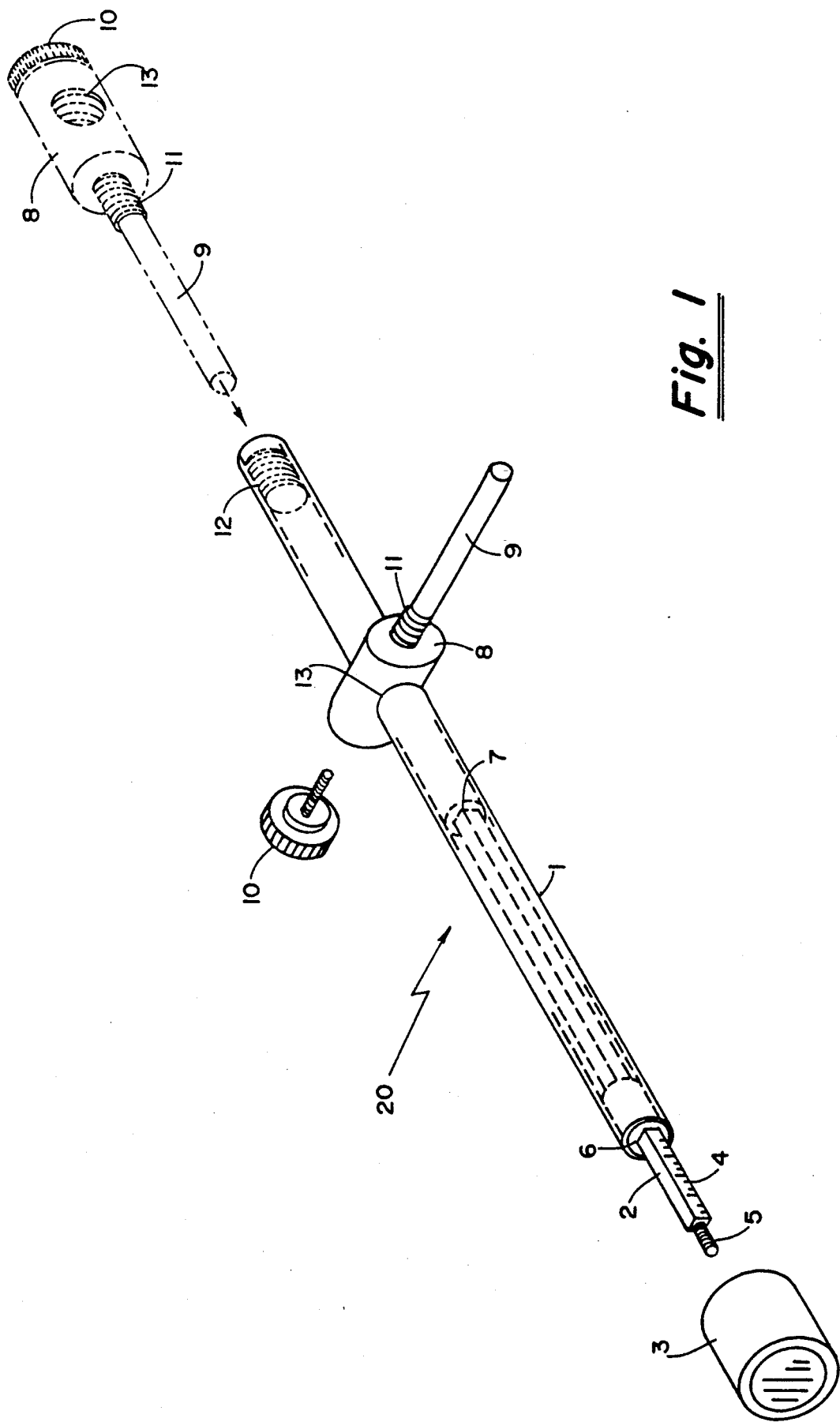
FIG. 1 is a partially exploded isometric view of the slack adjustment tester with the sliding pin body, pin and thumb set screw assembled in an alternate position to be installed for storage.

Referring now to FIG. 1 there is here shown the slack adjustment tester 20 "per se". The tester is formed of a generally cylindrical elongated body 1. The body 1 can have various cross sectional shapes such as square, round or triangular. Slidably supported inside body 1 by a bushing 6 is an elongated indicator 2. Indicator 2 could be supported externally on the tester body 1. The indicator 2 has readable indicating scale 4 thereon or it can be colour coded to give an indication of the brake adjustment. The indicator 2 is normally prevented from sliding completely out by means of a flanged portion 7. The indicator 2 shown includes a threaded end portion 5 for attachment to a mounting base 3. The mounting base 3 is generally in the form of a magnet which holds the slack adjustment tester 20 in its operative position on the air cylinder 23 shown in FIG. 2. The mounting base 3, in the event the air cylinder 23 is non magnetic could be clamped thereon or in close proximity thereto. The attachment of the elongated indicator 2 to the mounting base 3 can also e in the form of a multiposition pivotal detent in case the slack adjuster 24 is offset from the air cylinder 23. The pin body 8 which can have various shapes, is slidably received on elongated body 1 and fixed thereto by a thumb set screw 10 at a preferably zero setting of the elongated indicator 2, with the pin 9 abutting the slack adjuster arm 32, or in the event of a long push rod 33 a clamp may be affixed thereto to act as an abuttment. The pin 9 may have pin threads 11 to be received in pin body 8 so that it may be replaced with a pin of an alternate configuration. When the slack adjustment tester 20 is not in use the assembled pin body 8, pin 9 and thumb set screw 10 can be stored in the end of elongated body 1 by the pin thread 11 engaging elongated body end thread 12.

Figure 2:
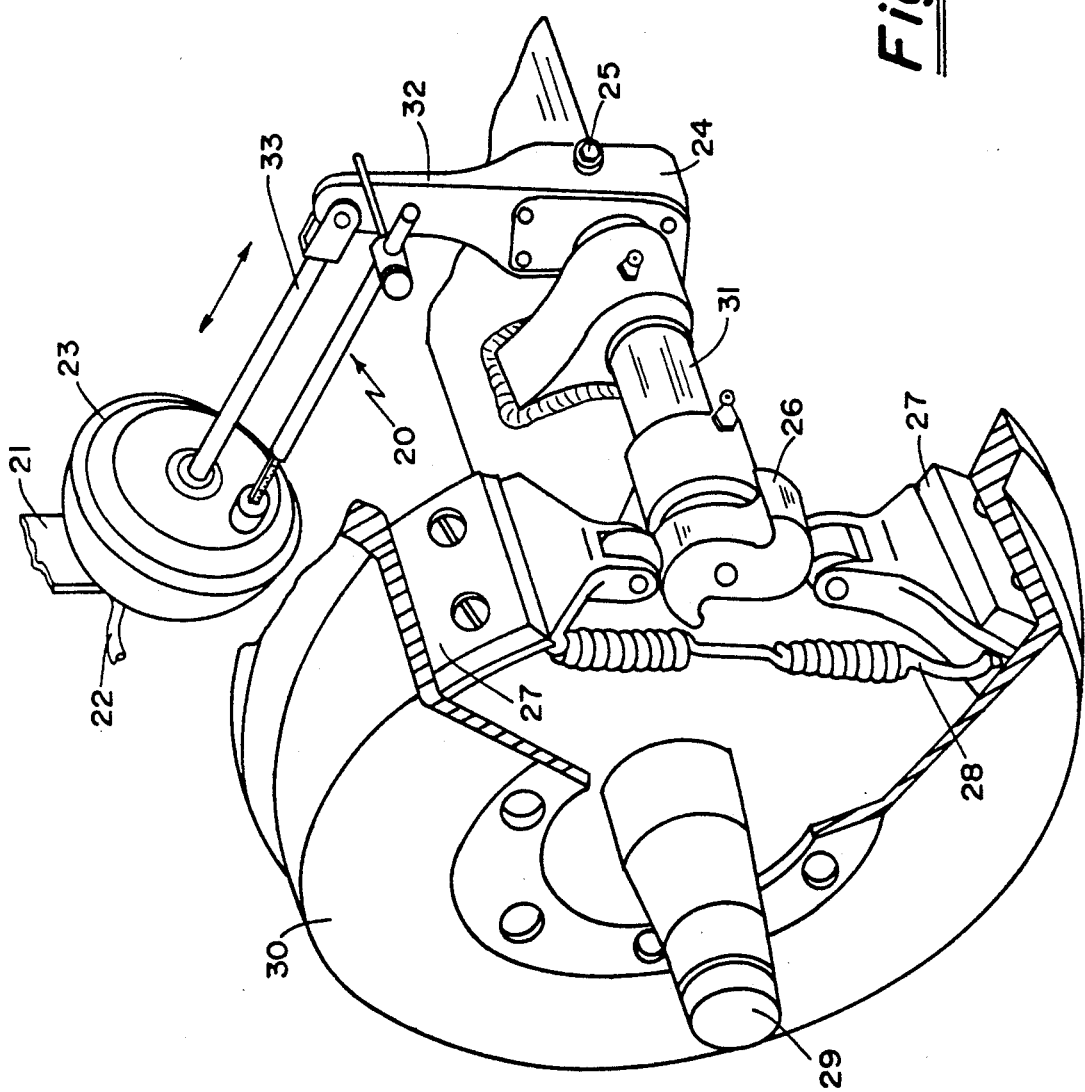
FIG. 2 is an isometric view of the slack adjustment tester placed in the operational position.

Referring now to FIG. 2 there is shown a conventional brake assembly with the slack adjustment tester 20 basically in operational position but slightly lowered for clarity. A conventional brake shoe assembly is normally mounted on a backing plate with an axle 29 protruding therefrom. On the backing plate are mounted brake shoes 27 surrounded by a brake drum 30 and held in position by brake return spring 28. A brake cam 26 when operated separates the brake shoes 27 so that they engage the brake drum 30 to create a vehicle retarding force. The brake cam 26 is rotated by a brake cam shaft 31 which has fixedly mounted thereon within slack adjuster 24 a gear which is rotated by a worm fixed to adjusting bolt 25. This adjusting of the worm and gear pivots the slack adjuster arm 32 relative to the air cylinder 23 which is fed through line 22 and is fixed to the vehicle undercarriage 21. It is this adjustment by the adjusting bolt 25 that determines how much slack exists between the operation of the air cylinder push rod 33 and the brake shoe engagement of the brake drum 30. Excessive slack can have disastrous results.

In operation the slack adjustment tester 20 is applied basically as shown in FIG. 2. The slack adjustment tester mounting base 3 is normally magnetic and is placed on a flat surface of the air cylinder 23 facing the slack adjuster 24. The elongate body 1 is usually zeroed by sliding elongated body 1 over the elongated indicator 2. The pin body 8 with pin 9 is slid along the elongated body 1 until the pin 9 engages the side of slack adjuster arm 32 away from the air cylinder 23. The thumb set screw 10 is now used to set the pin body 8 in this adjusted position. The brakes are now applied forcing the slack adjuster arm 32 to pivot away from the air cylinder 23. The degree of movement is now read on the elongated indicator 2. Excess slack is taken up by the adjusting bolt 25 until application of the brakes results in an acceptable slack.

Various modifications such as size, shape and arrangement of components may be made without departing from the spirit and scope of the invention. The above disclosure shall be interpreted as illustrative only and limited only by the scope of the invention as defined in the following claims.

What we claim is:

1. A slack adjustment tester for use with a vehicle braking system including an air cylinder, a push rod, a slack adjuster, brake shoes and a brake drum operating in series, said slack adjustment tester providing a readable indication of the slack that exists between said air cylinder movement and said brake shoes contacting said brake drum comprising in combination, an elongated tubular body member, a bushing mounted in a first end of said elongated tubular body member, an indicator means slidably supported by said bushing, said indicator means having a stop at a first end thereof for retention of said indicator means with said elongated tubular body member, a mounting means for mounting said slack adjustment tester on said air cylinder, attaching means at a second end of said indicator means attaching said indicator means to said mounting means, a pin body means slidable on said elongated tubular body member, a removable member received by said pin body means and engaging an arm of the slack adjuster, a setting means mounted in said pin body means, said setting means engaging said elongated tubular body member through said pin body means to fix said pin body means at an adjusted position, whereby a slack reading is provided on said indicator means when there is a relative elongating movement between said elongated tubular body member and said indicator means.

2. A slack adjustment tester as claimed in claim 1 wherein said elongated tubular body member is a cylindrical tube, wherein said indicator means carries readable indicia in the form of a scale, wherein said mounting means is a magnet, and wherein said relative elongating movement between said elongated tubular body member and said indicator means is provided by movement of said slack adjuster.

3. A slack adjustment tester for testing brake adjustment slack comprising in combination, elongated body means, elongated indicating means slidably supported within said elongated body means, a magnetically held sole mounting means, threaded means for attaching said elongated indicating means to said magnetically held sole mounting means, pin body means slidably engaging an arm of a slack adjuster and fixed solely to said elongated body means by a setting means in an adjusted position, whereby a moving force applied to said pin body means in a direction away from said magnetically held sole mounting means reveals the degree of movement of said moving force at said elongated indicating means.

4. A slack adjustment tester as claimed in claim 3 further said setting means including set screw means mounted in said pin body means to fix said pin body means to said elongated body means.

5. A slack adjustment tester as claimed in claim 2 wherein said pin body means has received therein the slack adjuster arm engaging means having a threaded portion.

6. A slack adjustment tester as claimed in claim 5 wherein said elongated body means includes an end thread to receive said threaded portion of said slack adjuster arm engaging means, to provide a storage location for said pin body means, said slack adjuster arm engaging means and said set screw means assembled as a unit.

7. A slack adjustment tester as claimed in claim 6 further including a support bushing in said elongated body means to slidably support said indicating means as it slidably moves in and out of said elongated body means.

8. A slack adjustment tester as claimed in claim 7 wherein said slack adjuster arm engaging means is in the form of a circular pin.

9. A slack adjustment tester as claimed in claim 8 wherein said indicating means carries indicia in the form of a color coding.

10. A slack adjustment tester for testing brake adjustment slack by an indication of movement of a slack adjuster arm comprising in combination, magnetic means for mounting said slack adjustment tester, indicating means with indicia thereon, elongated body means for slidably receiving said indicating means, means for attaching said indicating means to said magnetic means, pin body means slidable on said elongated body means, setting means for fixing said pin body means on said elongated body means in an adjusted position, means selectively removably received by said pin body means for engaging said slack adjuster arm to receive a moving force produced by movement of said slack adjuster arm whereby said moving force applied to said engaging means received by said pin body means and fixed to said elongated body means moves said elongated body means away from said magnetic means thereby giving a reading on said indicia.

11. A slack adjustment tester as claimed in claim 10 further including elongated body end means for holding in storage an assembled engaging means, pin body means and setting means.

* * * * *